May 23, 1961    S. B. PRELLWITZ    2,985,277
APPARATUS FOR TRANSFERRING MATERIAL
Filed June 10, 1958
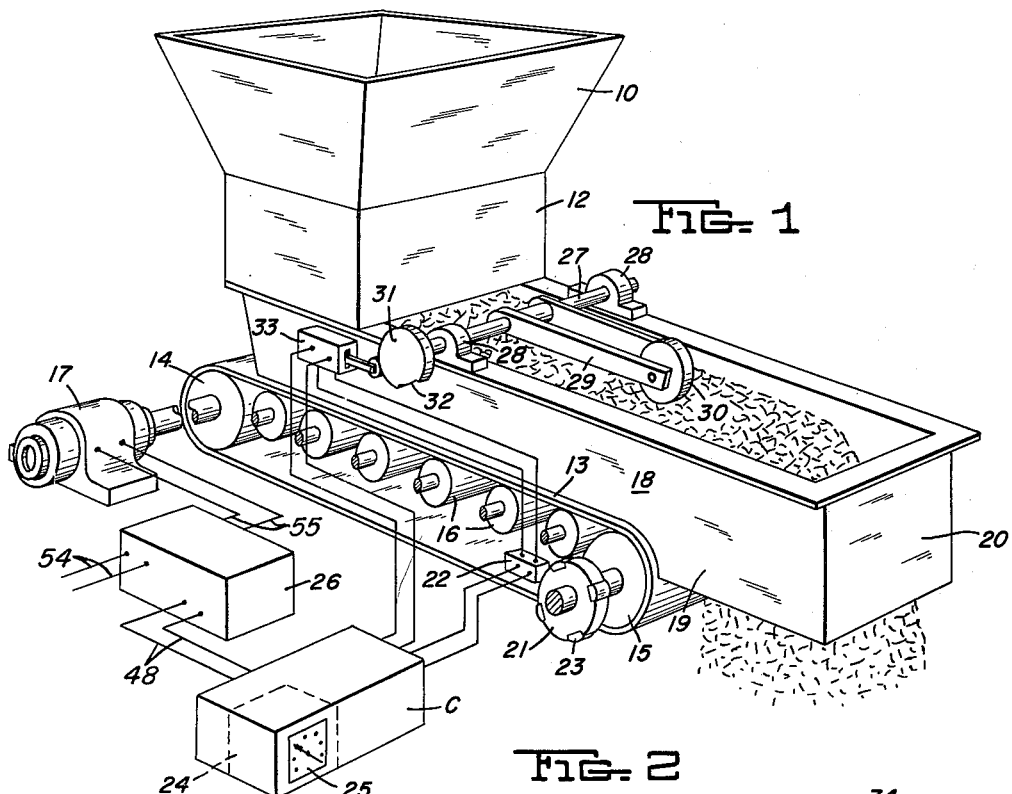
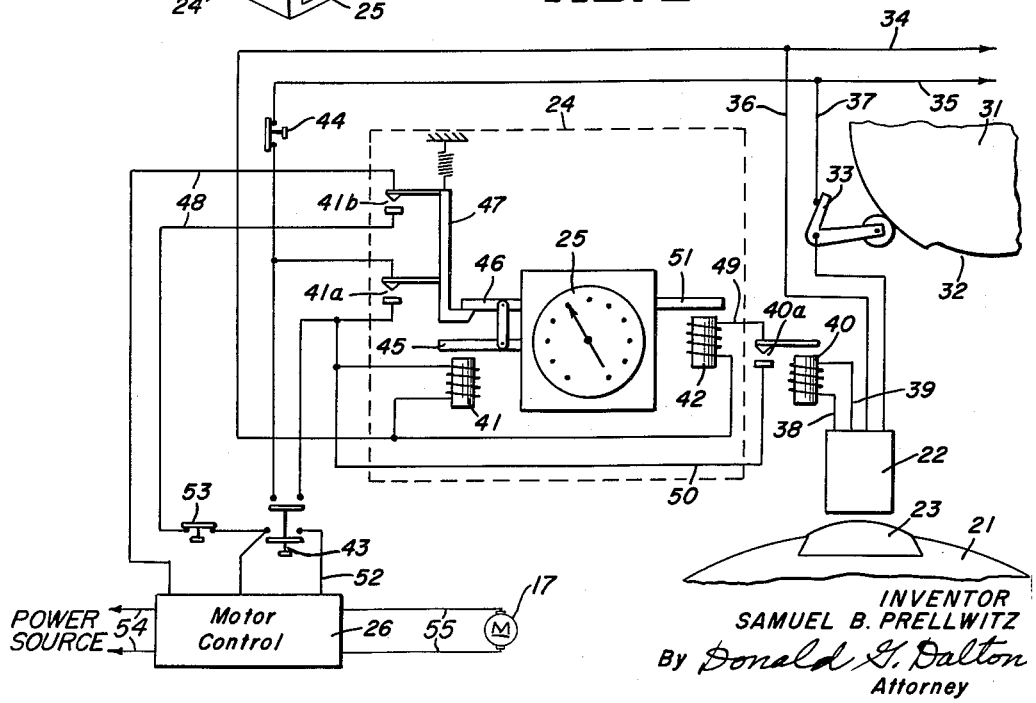
INVENTOR
SAMUEL B. PRELLWITZ
By Donald G. Dalton
Attorney

2,985,277

United States Patent Office

Patented May 23, 1961

2,985,277
APPARATUS FOR TRANSFERRING MATERIAL

Samuel B. Prellwitz, Fallsington, Pa., assignor to United States Steel Corporation, a corporation of New Jersey Filed June 10, 1958, Ser. No. 741,093

6 Claims. (Cl. 198—39)

This invention relates to an improved apparatus for transferring bulk material and controlling the quantity transferred.

The apparatus is best suited for controlling transfer of material where the need for precise control is secondary to the need for ruggedness and low cost in the equipment. One example is in loading ore or coal from a stationary bin into an open top railroad car, although obviously the invention is not thus limited, but has general application wherever similar handling problems are encountered. In this example each car desirably is loaded to within 90 percent of its rated capacity without going over, thus avoiding need for subsequent trimming. Experience has shown that conventional loading methods in which an operator uses his own judgment as to how much material to load in each car are too inaccurate. Nevertheless the tolerance is broad enough that precise weighing is unnecessary, and precision equipment available commercially is too costly to justify its use.

An object of the present invention is to provide a simple, low-cost, rugged apparatus for transferring bulk material and controlling the quantity, avoiding delicate costly apparatus now available, such as conventional weigh feeders.

A further object is to provide an apparatus of the foregoing type which can be applied to existing installations without otherwise altering their construction.

A more specific object is to provide an apparatus of the foregoing type which includes a conveyor for delivering material from a source to a receiver, and simplified inexpensive control means for measuring the quantity delivered and automatically stopping the conveyor after it has delivered a predetermined quantity.

In accomplishing these and other objects of the invention, I have provided improved details of structure, a preferred form of which is shown in the accompanying drawing, in which:

Figure 1 is a diagrammatic perspective view of an apparatus constructed in accordance with my invention; and Figure 2 is a schematic wiring diagram of a preferred control circuit.

Figure 1 shows a hopper 10 which has a discharge chute 12 at its lower end. The hopper normally is kept full or nearly so of bulk material, such as ore or coal. The feed end of a relatively short belt-type conveyor 13 is situated beneath chute 12. The conveyor includes a pair of spaced apart pulleys 14 and 15 and idler rollers 16 which support the belt. A drive motor 17 is mechanically connected with pulley 14 through suitable speed reduction gearing, not shown, for propelling the belt intermittently, as hereinafter explained. A pair of vertical side plates 18 are attached to the lower end of the discharge chute 12 and extend along the side edges of the belt. These plates have downward extensions 19 located beyond the discharge end of the conveyor. A vertical end plate 20 is connected between the ends of the side plates. Normally the conveyor carries material from the hopper to a depth approximately even with the upper edges of the side plates.

A control wheel 21 is mounted on the shaft which supports pulley 15. An impulse switch 22, which acts in response to the number of fractional revolutions of said wheel, is mounted adjacent thereto. Preferably the switch is of the magnetic proximity type actuated by four steel slugs 23 mounted on the circumference of the control wheel and spaced at 90° intervals. Thus the switch can generate an impulse each time pulley 15 and wheel 21 turn a quarter revolution and carry one of the slugs 23 past it. Nevertheless a mechanically operated switch obviously would be equivalent in most respects. Switch 22 is electrically connected to a control box C, which includes an impulse counter 24 with a dial 25. The counter is more fully described hereinafter. The control box is electrically connected to a motor control 26 via a pair of conductors 48. The motor control 26 is electrically connected to a suitable power source via a pair of conductors 54 and to the drive motor 17 via a pair of conductors 55.

The bulk density of the material is known. Consequently, as long as the conveyor is fully loaded, the distance the conveyor travels affords a rough measurement of the weight of material which discharges therefrom. The number of impulses from switch 22 of course furnish a measurement of the distance of conveyor travel. The counter 24 is set to stop the drive motor 17 each time its dial 25 registers a predetermined number of impulses, thus indicating that the conveyor has delivered a predetermined quantity of material, for example the quantity needed to make one carload.

Preferably the apparatus is equipped with mechanisms for stopping the count of impulses when the conveyor is not fully loaded. This mechanism includes a shaft 27 journaled in bearings 28 at the upper edges of the side plates 18. A radially extending bracket 29 is fixed to the shaft and a follower wheel 30 is journaled to the end of the bracket and rides on the upper surface of material carried by the conveyor. A cam 31 is fixed to the end of the shaft and has a sector 32 of reduced radius. A limit switch 33 is mounted on the side plate 18 and is electrically connected to the impulse switch 22. Switch 33 has an operating arm which bears against cam 31. As long as the conveyor is fully loaded, the cam maintains the limit switch closed to complete a current path to the impulse switch. When the level of material on the conveyor drops, wheel 30 likewise drops and turns shaft 27 to a position where the reduced sector 32 of the cam engages the operating arm of the limit switch. Thus the cam opens the limit switch and breaks the current path to the impulse switch, whereby the counter ceases to operate.

Figure 2 is a schematic wiring diagram of the preferred control circuit, which is energized from a suitable outside source via lines 34 and 35. Conductors 36 and 37 connect these lines to the impulse switch 22. The limit switch 33 is connected in conductor 37, whereby the current path to the impulse switch is broken when the limit switch opens as already explained. Conductors 38 and 39 connect the impulse switch to the coil of a relay 40 in the control box C. Relay 40 has normally open contacts 40a. Each time a slug 23 passes the impulse switch, the switch momentarily closes and energizes relay 40 and thus momentarily closes contacts 40a. Since magnetic proximity switches of the preferred type are known commercial items, no detailed disclosure of the switch is deemed necessary.

The counter 24 includes a "clutch" coil 41 and a "count" coil 42, besides the dial 25 previously mentioned. The "clutch" coil 41 is connected across lines 34 and 35 in series with normally open contacts of a "start" button 43 and normally closed contacts of a "stop" button 44. Thus the "clutch" coil is energized when the "start" button is depressed. The "clutch" coil operates an armature 45. A latch lever 46 mechanically connects armature 45 with a spring-loaded contact carrier 47, which carries two normally open contacts 41a and 41b. When the "clutch" coil is energized, contacts 41a close to seal it in, bypassing the "start" button 43. Contacts 41b are connected in a circuit 48 which goes to the motor control 26.

One end of the "count" coil 42 is connected directly to line 34. A conductor 49 connects the other end of the "count" coil to one side of contacts 40a of relay 40, and a conductor 50 connects the other side of these contacts to one side of the contacts 41a. Thus closing of contacts 41a conditions a current path through the "count" coil. Each time contacts 40a close, this current path is completed and the "count" coil momentarily energized. The "count" coil operates an armature 51, and each time the coil is energized, it attracts this armature and then releases the armature when deenergized. Each such operation of armature 51 registers a count on dial 25. When a preset number of counts are registered, the latch lever 46 releases the contact carrier 47, whereupon contacts 41a and 41b open. Opening of contacts 41a deenergizes both the "clutch" coil and the "count" coil. When the "clutch" coil is deenergized, the latch lever 46 again engages the contact carrier 47 and resets the dial. Opening of contacts 41b breaks circuit 48 and thus stops the motor 17. Both the counter 24 and motor control 26 are known devices available commercially. Therefore no more detailed description is deemed necessary.

"Start" button 43 has a second set of normally open contacts in a circuit 52 of the motor control connected in parallel with circuit 48, whereby motor 17 starts when "start" button 43 is depressed. With contacts 41b closed, the motor circuit is made continuous through circuit 48 after the "start" button is released, and the motor 17 continues to operate. If it is desired to reset the dial 25 and stop the conveyor, "stop" button 44 can be depressed to break the current path to the "clutch" coil. If it is desired to stop the motor 17 without disturbing the count, a "stop" button 53 in circuit 48 can be depressed.

The control box C can be located away from the conveyor 13 and hopper 10 so that it is not subject to hard usage. The conveyor and other parts which carry the material can be of rugged construction and are not easily damaged. A minimum of precision parts are required; hence the device is economical to manufacture. It possesses sufficient accuracy for many applications where close tolerances are not required, and where use of a belt scale or a weigh feeder would not be justified because of the high cost.

While I have shown and described only a single embodiment of the invention, it is apparent that modifications may arise. Therefore, I do not wish to be limited to the disclosure set forth but only by the scope of the appended claims.

I claim:

1. An apparatus for transferring bulk material and controlling the quantity transferred comprising a conveyor adapted to carry a bed of material of predetermined depth from a feed point to a discharge point, drive means for propelling said conveyor, means for measuring the distance said conveyor travels when propelled by said drive means and while carrying material and thus furnishing a rough measurement of the quantity of material transferred to the discharge point, control means for stopping said conveyor after said measuring means registers that the conveyor has traveled a predetermined distance indicative that a predetermined quantity of material has been transferred to the discharge point, and means for stopping operation of said measuring means when the depth of material carried by said conveyor drops below the predetermined depth.

2. An apparatus for transferring bulk material and controlling the quantity transferred comprising a conveyor adapted to carry a bed of material of predetermined depth from a feed point to a discharge point, drive means for propelling said conveyor, means for generating an electric impulse each time said conveyor travels a predetermined distance when propelled by said drive means and while carrying material, means for counting the impulses and thus furnishing a rough measurement of the quantity of material transferred to the discharge point, and control means electrically connected to said counting means and to said drive means for deenergizing said drive means and stopping said conveyor after said counting means registers that said conveyor has traveled a predetermined distance indicative that a predetermined quantity of material has been transferred to the discharge point.

3. An apparatus as defined in claim 2 including a limit switch in series with said impulse generating means, and means for opening said limit switch when the depth of material on said conveyor drops below the predetermined depth and thus stopping operation of said counting means.

4. An apparatus for transferring bulk material and controlling the quantity transferred comprising a belt-type conveyor, vertical side plates supported along the side edges of said conveyor, drive means for propelling said conveyor, said conveyor being adapted to carry a bed of material from a feed point to a discharge point, which bed has a predetermined depth defined by the upper edges of said plates, means for measuring the distance said conveyor travels when propelled by said drive means and while carrying material and thus furnishing a rough measurement of the quantity of material transferred to the discharge point, control means for stopping said conveyor after said measuring means registers that the conveyor has traveled a predetermined distance indicative that a predetermined quantity of material has been transferred to the discharge point, a follower mounted on the upper edges of said plates for contacting the upper surface of material carried by said conveyor, and means operated by said follower for stopping operation of said measuring means when the depth of material carried by the conveyor drops below the predetermined depth.

5. An apparatus for transferring bulk material and controlling the quantity transferred comprising a belt-type conveyor, vertical side plates supported along the side edges of said conveyor, drive means for propelling said conveyor, said conveyor being adapted to carry a bed of material from a feed point to a discharge point, which bed has a predetermined depth defined by the upper edges of said plates, a switch for generating electric impulses, means for repeatedly actuating said switch each time said conveyor travels a predetermined distance when propelled by said drive means and while carrying material, means for counting the impulses and thus furnishing a rough measurement of the quantity of material transferred to the discharge point, and control means electrically connected to said counting means and to said drive means for deenergizing said drive means and stopping said conveyor after said counting means registers that said conveyor has traveled a predetermined distance indicative that a predetermined quantity of material has been transferred to the discharge point.

6. An apparatus as defined in claim 5 including a limit switch in series with said first named switch, and means for opening said limit switch when the depth of material drops below the predetermined depth and thus stopping operation of said counting means.

References Cited in the file of this patent

UNITED STATES PATENTS

| 1,151,956 | Lea | Aug. 31, 1915 |
| 1,287,872 | Butler | Dec. 17, 1918 |
| 2,316,310 | Bliss | Apr. 13, 1943 |
| 2,690,833 | Peterson | Oct. 5, 1954 |

FOREIGN PATENTS

| 315,886 | Great Britain | Oct. 20, 1930 |